(12) United States Patent
Morimoto et al.

(10) Patent No.: US 8,012,054 B2
(45) Date of Patent: Sep. 6, 2011

(54) ROCKER JOINT PIN TYPE SILENT CHAIN

(75) Inventors: Takayuki Morimoto, Osaka (JP);
Hitoshi Ohara, Osaka (JP); Minoru Komada, Osaka (JP); Kazufumi Kotani, Osaka (JP); Shuuji Hamaguchi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 480 days.

(21) Appl. No.: 12/204,222

(22) Filed: Sep. 4, 2008

(65) Prior Publication Data
US 2009/0131209 A1   May 21, 2009

(30) Foreign Application Priority Data

Nov. 20, 2007 (JP) ................ 2007-300036

(51) Int. Cl.
*F16G 13/04* (2006.01)
(52) U.S. Cl. .............. 474/215; 474/229; 59/84
(58) Field of Classification Search .......... 474/202, 474/206, 211, 212, 213, 214, 215, 216, 217, 474/229–230; 59/78, 84
See application file for complete search history.

(56) References Cited

U.S. PATENT DOCUMENTS

| 5,453,059 | A  | * | 9/1995 | Avramidis et al. ......... 474/212 |
| 6,186,921 | B1 |   | 2/2001 | Kotera |
| 6,260,345 | B1 |   | 7/2001 | Kanehira et al. |
| 6,432,011 | B1 |   | 8/2002 | Kanehira et al. |
| 2002/0137584 | A1 | | 9/2002 | Horie et al. |
| 2007/0072722 | A1 | * | 3/2007 | Kamamoto et al. ......... 474/245 |

FOREIGN PATENT DOCUMENTS

| EP | 1860343 A2 | 3/2007 |
| JP | 2000-130518 A | 5/2000 |
| JP | 2001-003996 A | 1/2001 |

* cited by examiner

*Primary Examiner* — William E Dondero
(74) *Attorney, Agent, or Firm* — Howson & Howson LLP

(57) ABSTRACT

In a rocker joint silent chain, the link plates have two different engagement pitches, and the connecting pins are composed of combinations of rocker pins and joint pins, where each rocker pin has one of two thicknesses and each joint pin has one of two thicknesses, so that the rocker joint pins of the chain have three different thicknesses. The link plates and connecting pins are arranged randomly along the length of the chain.

4 Claims, 5 Drawing Sheets

ROCKER JOINT PIN TYPE SILENT CHAIN

CROSS-REFERENCE TO RELATED APPLICATION

This application claims priority on the basis of Japanese patent application 2007-300036, filed Nov. 20, 2007. The disclosure of Japanese application 2007-30036 is hereby incorporated by reference.

FIELD OF THE INVENTION

This invention relates to a silent chain for use in a power transmitting mechanism, such as in an automobile or the like, and more specifically it relates to a rocker joint pin type silent chain, in which periodic engagement noises are reduced.

BACKGROUND OF THE INVENTION

In a rocker joint pin type silent chain, the connecting pins used to connect interleaved, adjacent rows of link plates are composed of pairs of pins, one pin being a so-called joint pin, which is press-fit into guide plates on both sides of the chain, and the other being a so-called rocker pin, which has a convex surface in rocking engagement with a facing convex surface of a joint pin.

A known silent chain having rocker joint pins is described in Japanese Laid-Open Patent Publication No. 2000-130518. In this chain, link plates, each having a pair of teeth and a pair of pin holes, are connected to one another by connecting pins inserted into pin holes. Guide links are disposed on outer sides of the outermost link plates. Links having differently protruding inner flanks are randomly mixed in the chain.

Another known silent chain having rocker joint pins is described in U.S. Pat. No. 6,432,011. This chain is composed of link modules composed of link plates each including a pair of front and rear engagement portions and a pair of front and rear pin holes. The rocker joint pins in this chain include a first rocker joint pin composed of a first longer pin and a first shorter pin, each having a different first thickness in the direction of the pitch of the chain, and a second rocker joint composed of a second longer pin and a second shorter pin, each having a different second thickness in the pitch direction. The second thickness of the second longer or shorter pin is different from the first thickness of a corresponding one of the first longer and shorter pins. The first joint rocker pin and the second rocker joint pin are arranged in an irregular pattern along the length of the silent chain.

Assembly of the silent chain of Japanese Laid-Open Patent Publication No. 2000-130518 is difficult because, although it is desirable to have a large number of different engagement patterns, achieving this objective requires the incorporation of a large number of different link plates into the chain, increasing the number of different parts required for assembly of the chain.

In the rocker joint silent chain of U.S. Pat. No. 6,432,011, the chain pitch is limited to three different chain pitches, so that periodic engagement noise cannot be adequately suppressed.

This invention addresses the above-described problems in the prior art. By combining the effects of an arrangement of differently shaped link plates with an arrangement of rocker pin and joint pin combinations, a large number of different, engagement pitches can be realized, and periodic engagement noise can be significantly reduced. Further, by adopting a randomized arrangement of the link plates and connecting pins, periodic engagement noise can be still further reduced.

SUMMARY OF THE INVENTION

The silent chain according to the invention comprises an elongated series of widthwise rows of link plates. Each link plate comprises a pair of sprocket-engaging portions and a pair of pin holes for receiving connecting pins. The adjacent rows are interleaved and articulably interconnected by connecting pins so that the chain is in the form of an endless loop. Each connecting pin is composed of a joint pin and a rocker pin, both extending widthwise of the chain, and being in rocking contact with each other, with one of the joint pin and the rocker pin being forward of the other along the direction of elongation of the chain. The link plates comprise a first set of link plates having a first engagement pitch, and a second set of link plates having a second engagement pitch different from the first engagement pitch. The link plates of the first and second sets are disposed along the length of the chain. The connecting pins of the chain have multiple different thicknesses measured in the direction of the length of the chain, and the connecting pins of each different thickness are also disposed along the length of the chain.

Preferably, in each widthwise row of link plates in the chain, all of the link plates have the same engagement pitch. In addition, in the chain, all of the link plates having a pair of sprocket-engaging portions and a pair of pin holes for receiving connecting pins preferably are link plates of the first set or link plates of the second set. That is, the link plates of the chain that have sprocket-engaging portions and a pair of pin holes consist of link plates of the first set and link plates of the second set.

The connecting pins of the chain preferably consist of a first group of connecting pins having a first thickness, a second group of connecting pins having a second thickness, and a third group of connecting pins having a third thickness. Pins having at least three different thicknesses can be formed by combinations of rocker pins having two different thicknesses and joint pins having two different thicknesses. Thus, in a preferred embodiment, the connecting pins comprise a first connecting pin composed of a rocker pin having a first thickness and a joint pin having a first thickness, a second connecting pin composed of a rocker pin having a second thickness and a joint pin having a second thickness, and a third connecting pin in which one of the rocker pins and joint pins has said first thickness and the other of the rocker pins and joint pins has said second thickness.

The chain can be utilized with sprockets having uniform tooth pitches. When the chain engages with a sprocket having a uniform tooth pitch, the random arrangement of the link plates having two different engagement pitches and connecting pins having multiple different thicknesses, a large number of engagement patterns is realized. Therefore, periodic engagement noise is significantly reduced.

BRIEF DESCRIPTION OF THE DRAWINGS

FIG. 2(*b*) is an enlarged elevational view of a second link plate used in the chain;

DETAILED DESCRIPTION OF THE PREFERRED EMBODIMENTS

In general, in accordance with the invention, a silent chain is composed of at least two kinds link plates having different engagement shapes, and at least three different kinds of rocker joint connecting pins having different thicknesses. When the link plates and connecting pins are arranged along the length of the chain, periodic engagement noise can be significantly reduced. Periodic engagement noise can be further reduced by adopting a randomized arrangement of the links composed of each of the two different kinds of link plates, and by adopting a randomized arrangement of the connecting pins having different thicknesses.

Figure 1:
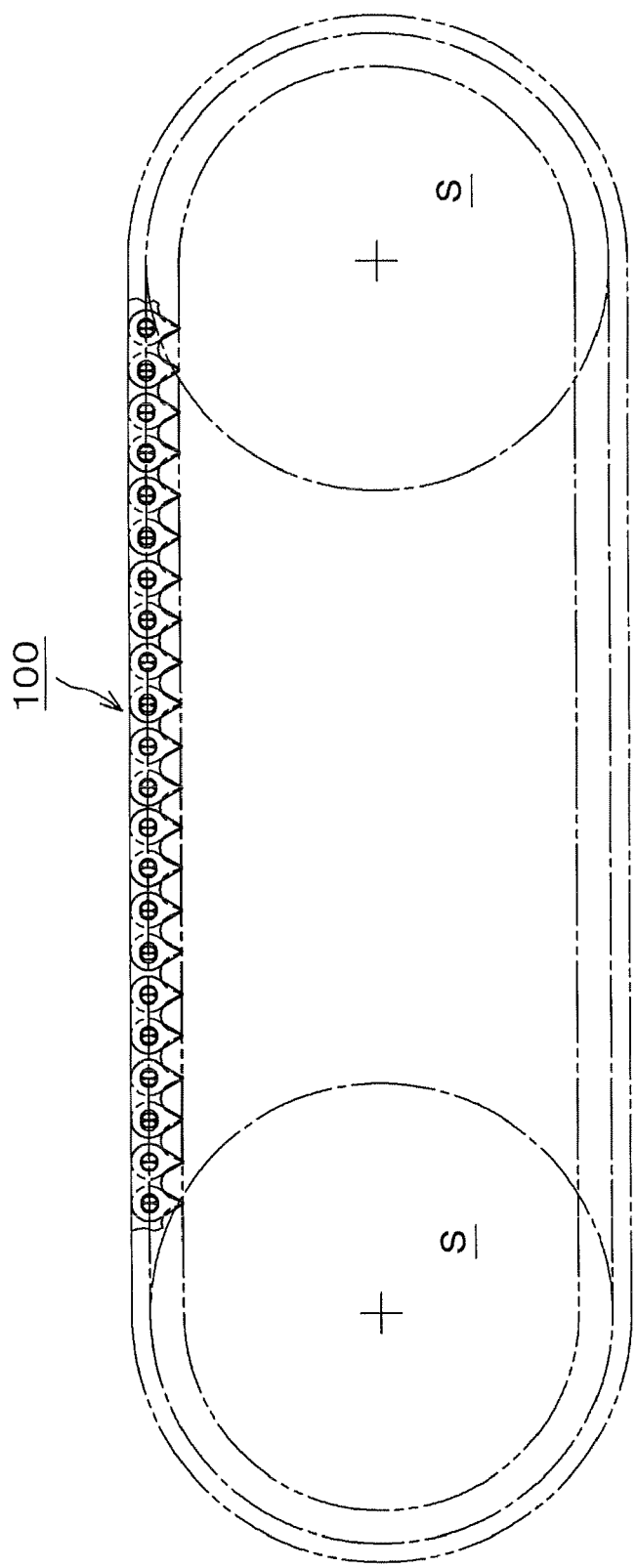
FIG. 1 is a schematic elevational view of a chain transmission, in which a chain according to the invention is engaged with a pair of sprockets.

The rocker joint pin type silent chain 100, as shown in FIG. 1, can be used in any of a wide variety of mechanisms. The chain meshes with sprockets S having involute teeth to transmit power from one sprocket to the other.

Figure 2A:
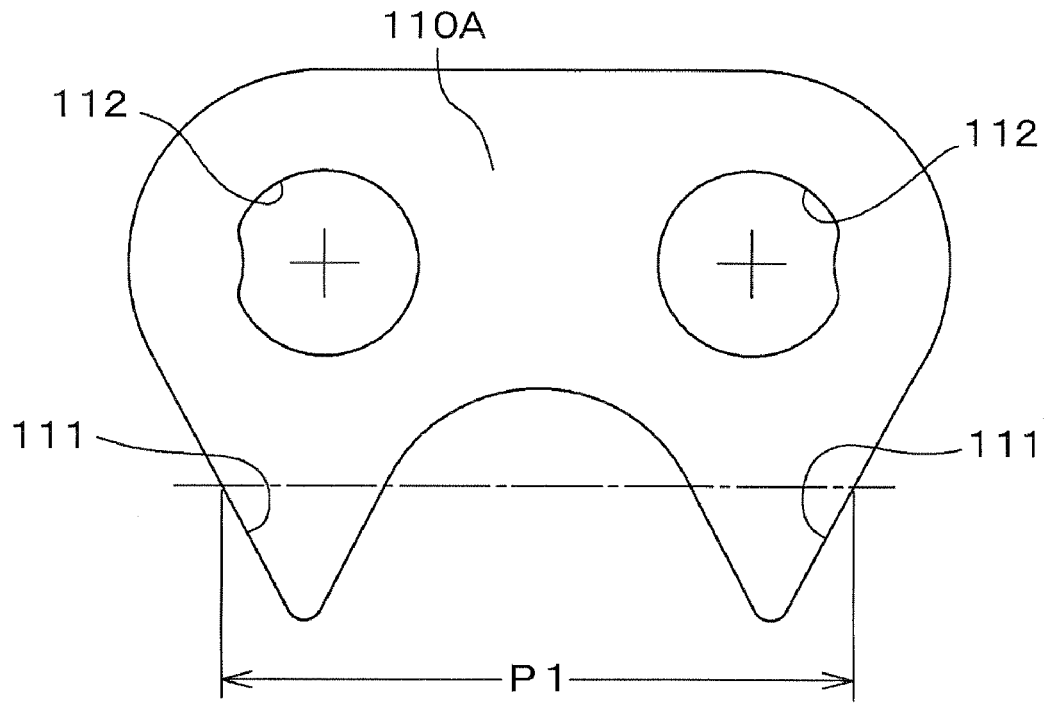
FIGS. 2(*a*) and 2(*b*) are enlarged elevational views, respectively, of first and second link plates used in the chain.
Figure 2B:
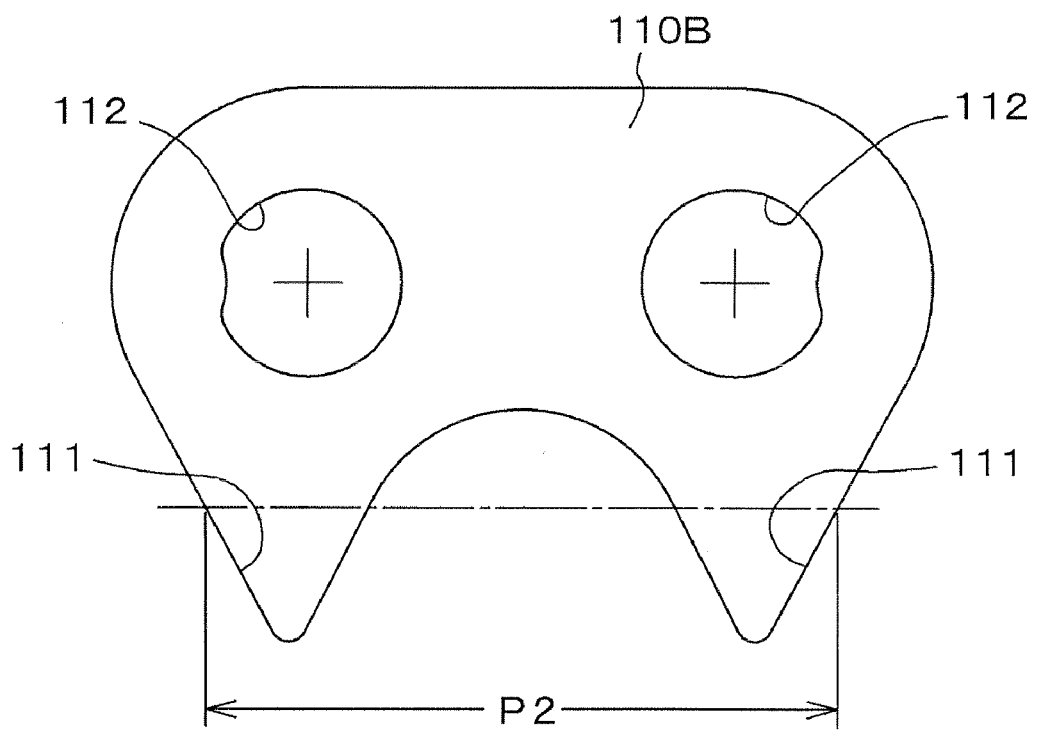
Figure 3:
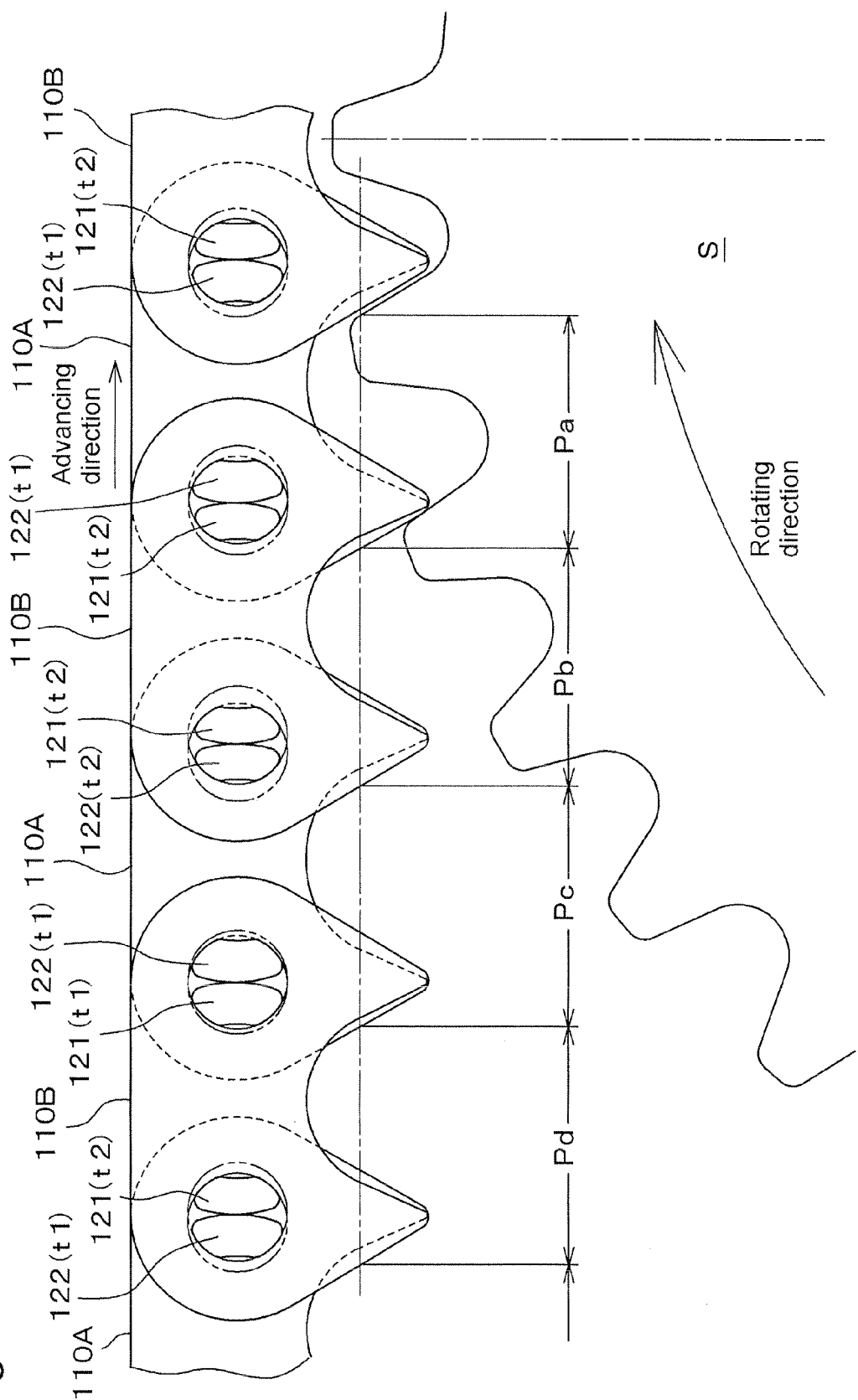
FIG. 3 is an enlarged elevational view of a part of the chain transmission of FIG. 1, showing the engagement of the chain with a sprocket.

As shown in FIGS. 1-3, the chain comprises a plurality of link plates, each having front and rear sprocket-engaging portions 111 and front and rear pin holes 112. The link plates are arranged in rows extending widthwise of the chain, and are interleaved and connected by rocker joint pins 120. Each rocker joint pin is composed of a rocker pin 121 and a joint pin 122, one following the other along the longitudinal direction of the chain. The chain engages sprockets S both of which having a uniform tooth pitch, i.e., a fixed engagement pitch. The arrows in FIG. 3 respectively show the direction of chain advancement and the direction of sprocket rotation.

Although not shown in FIGS. 1 and 3, guide plates are provided on both sides of the chain, and the joint pins 122, which are longer than the rocker pins 121, are press-fit into the guide plates. Thus, the chain 100 comprises guide row links, each composed of parallel link plates disposed between right and left guide plates, and joint row links, each composed of parallel link plates. The guide row links and joint row links are disposed in an alternating arrangement along the length of the chain, interleaved with one another, and connected by rocker joint pins 120.

Figure 5:
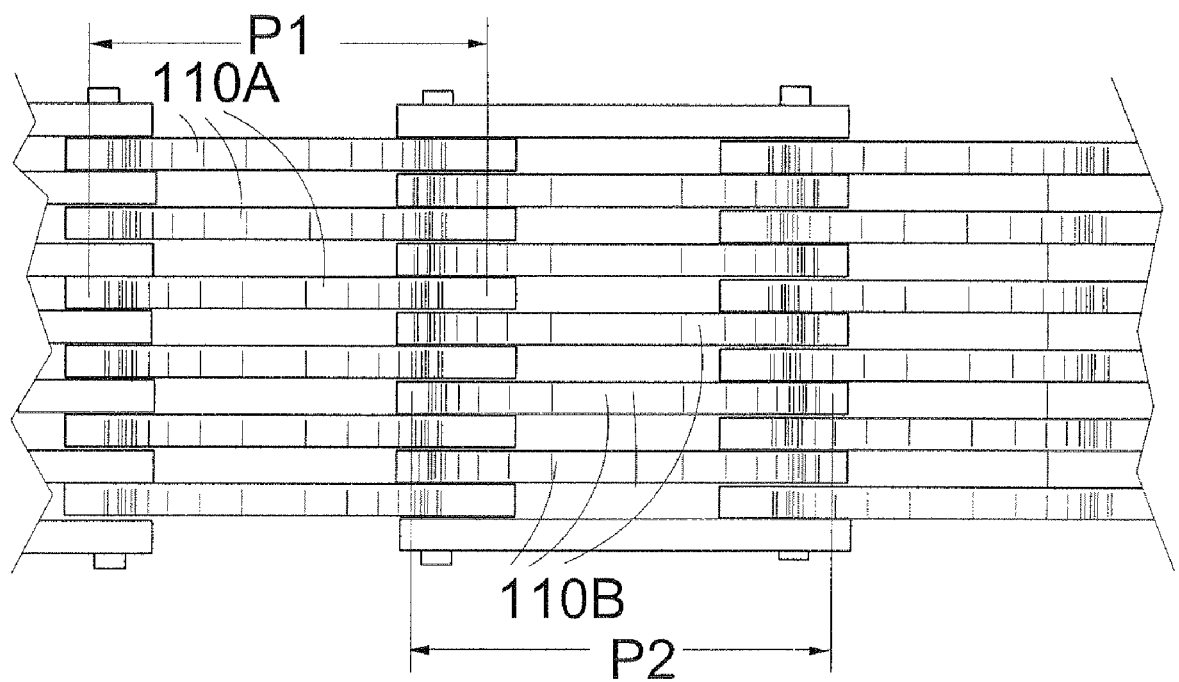
FIG. 5 is a schematic bottom plan view showing the teeth of the link plates of the chain.

The link plates of the chain are preferably outer flank seating link plates as shown in FIGS. 2(a) and 2(b), that is, link plates that seat on a sprocket with only their outer flanks in engagement with the sprocket teeth. Preferably the link plates of the chain other than the guide plates, consist of only two kinds of link plates, 110A and 110B, having different engagement shapes. The link plates 110A have outer flanks that bulge outward slightly compared to the outer flanks of plates 110B. Therefore, as shown in FIGS. 2(a) and 2(b), the respective engagement pitch P1 of plates 110A is slightly greater than the engagement pitch P2 of link plates 110B. That is, P1>P2. This relationship of the engagement pitches can be achieved by forming the outer flanks of the engagement portions 111 of plates 110A with a slight convex curvature, and forming the engagement portions of plates 110B with straight outer flanks. All of the link plates in each widthwise row of the chain preferably have the same engagement pitch. As shown in FIG. 5, all of the link plates 110A in a joint row have an engagement pitch P1, and all of the link plates 110B in a guide row have an engagement pitch P2.

The link plates can have linear flanks, curved flanks, or flanks formed of combinations of curved and linear portions. The engagement portion of a link plate used in the invention is preferably subjected to shaving or fine blanking. For example, when the shearing surface of the engagement portion is about 70% or more of the thickness of the link plate, impact noises are significantly reduced and endurance of the chain over a long period of time can be realized.

Links composed of these two kinds of link plates 110A and 110B are arranged along the longitudinal direction of the chain. An example of one form of arrangement is the alternating arrangement illustrated in FIG. 3.

The rocker joint pins 120 comprise two kinds of rocker pins 121 and two kinds of joint pins 122. The two kinds of rocker pins 121 can have thicknesses t1 and t2, respectively, and the two kinds of joint pins 122 can also have thicknesses t1 and t2. In this case, three different connecting pin thicknesses can be realized by utilizing the combinations depicted in FIGS. 4(a)-4(c). In these pins, t1>t2. The connecting pins extend through pin holes in overlapping link plates of successive rows, with the joint pins 122, which are longer than the rocker pins 121, being press-fit into guide plates (not shown).

Figure 4A:
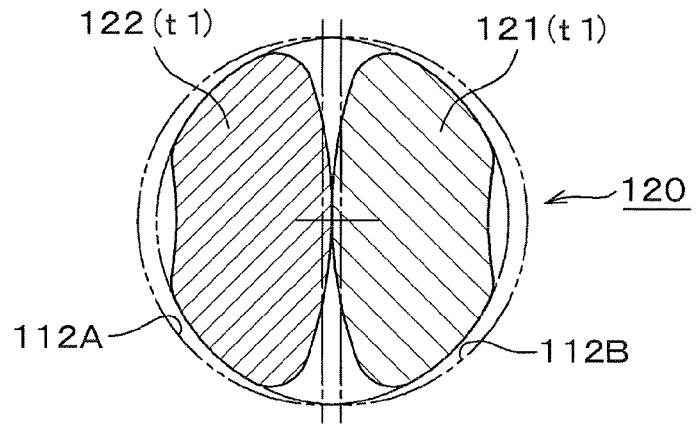
FIGS. 4(a), 4(b) and 4(c) are schematic views showing is an explanatory view showing different pin combinations utilized in the chain of the invention.
Figure 4B:
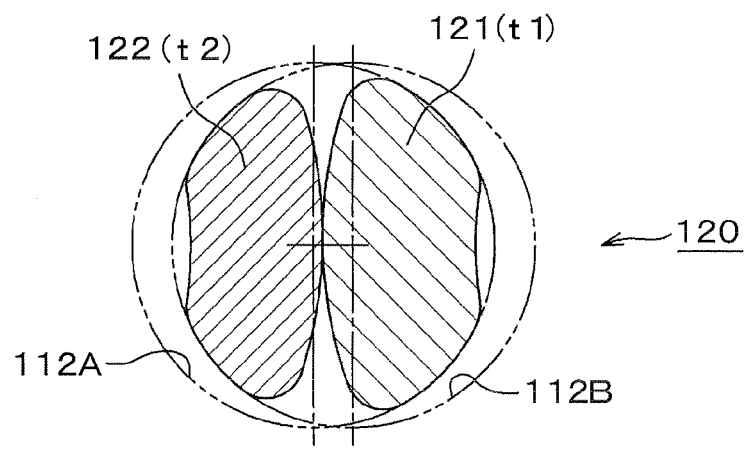
Figure 4C:
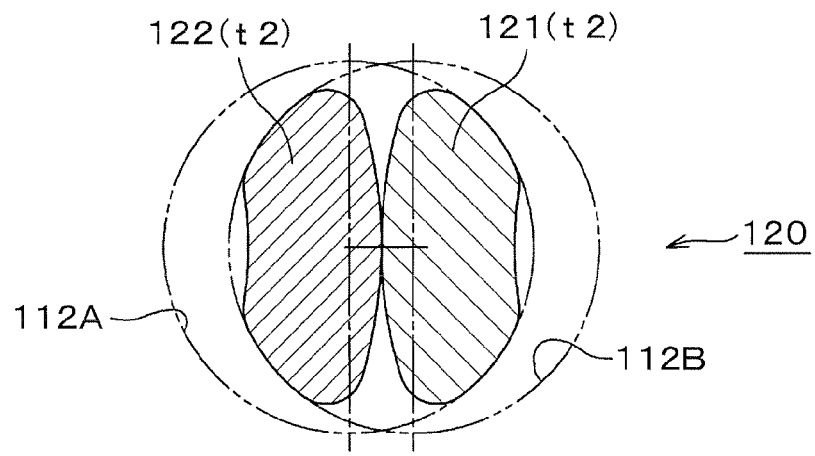

In FIGS. 4(a)-4(c), reference number 112A designates a pin hole of a joint row link, and reference number 112B designates a pin hole of a guide row link. The vertical lines in FIGS. 4(a)-4(c) designate the centers of the pin holes 112B of adjacent link plates 110, and the spacings of these vertical lines correspond to the relative positions of adjacent link rows with the chain is stretched.

FIG. 4(a) shows the envelope of the overlapping pin holes 112A and 112B of adjacent link plates 110 when the rocker pin 121 and the joint pin 122 are both pins having a large thickness t1. FIG. 4(b) shows the envelope of the overlapping pin holes 112A and 112B of adjacent link plates 110 when the rocker pin 121 has a large thickness t1 and the joint pin 122 has a smaller thickness t2. The effective pin hole of FIG. 4(b) is smaller than the effective pin hole in FIG. 4(a). FIG. 4(c) shows the envelope of the overlapping pin holes 112A and 112B of adjacent link plates 110 when the rocker pin 121 and the joint pin 122 both have the smaller thickness t2. The effective pin hole of FIG. 4(c) is smaller than the effective pin hole in FIG. 4(b).

From FIGS. 4(a), 4(b) and 4(c), it can be seen that four different engagement pitches can be realized by using combinations of pin thicknesses t1 and t2. These engagement pitches Pa, Pb, Pc and Pd, are the distances between successive trailing flanks at the pitch line. Still more engagement pitches can be realized by adopting a third thickness, i.e., by making the thicknesses of a rocker pin or a joint pin different from thickness t1 and from thickness t2, or by adopting third and fourth thickness, i.e. by making the thicknesses of both rocker pins different from either of the two thicknesses of the joint pin.

Where two kinds of link plates 110A and 110B having different engagement shapes, and two kinds of rocker pins 121 and joint pin 122 having thicknesses t1 and t2 are adopted in the chain, two kinds of engagement patterns are due to the different link plates, and four kinds of engagement patterns are due to the different pin thicknesses. Therefore, 2×2×2, or eight, different engagement pitches (Pa, Pb, Pc, Pd . . . , Ph) can be realized. Thus, engagement with a sprocket can be effectively randomized and periodic engagement noise can be significantly reduced.

Although the preferred type of link plate used in the silent chain according to the invention is the outer flank engagement, outer flank seating link plate, other forms of link plates can be used. These include an inner flank engagement, inner flank seating link plate, and an inner flank engagement, outer flank seating link plate.

As mentioned above, in the embodiment shown and described, utilizing two kinds of link plates, two kinds of rocker pins, and two kinds of joint pins, where the thickness of each rocker pin is the same as the thickness of one of the joint pins, eight different engagement pitches can be realized. If three kinds of link plates are adopted, twelve (3×2×2) engagement pitches can be realized. Similarly, when two kinds of link plates are used, but three kinds of rocker pin and joint pin thicknesses are adopted, eighteen (2×3×3) engagement pitches can be realized.

We claim:

1. A silent chain comprising an elongated series of widthwise rows of link plates, each link plate comprising a pair of sprocket-engaging portions and a pair of pin holes for receiving connecting pins, the adjacent rows being interleaved and articulably interconnected by connecting pins whereby the chain is in the form of an endless loop, wherein:

each connecting pin is composed of a joint pin and a rocker pin, both extending widthwise of the chain, and being in rocking contact with each other, with one of said joint pin and said rocker pin being forward of the other along the direction of elongation of the chain;

the link plates comprise a first set of link plates having a first engagement pitch, and a second set of link plates having a second engagement pitch different from said first engagement pitch;

the link plates of the first and second sets are disposed along the length of the chain;

the connecting pins of the chain have multiple different thicknesses measured in the direction of the length of the chain;

the connecting pins of each different thickness are disposed along the length of the chain; and the connecting pins of the chain comprise a first connecting pin composed of a rocker pin having a first rocker pin thickness and a joint pin having a first joint pin thickness, a second connecting pin composed of a rocker pin having a second rocker pin thickness different from said first rocker pin thickness and a joint pin having a second joint pin thickness different from said first joint pin thickness, and a third connecting pin composed of a rocker pin having one of said first and second rocker pin thicknesses and a joint pin having one of said first and second joint pin thicknesses, in which, if the rocker pin of the third connecting pin has said first rocker pin thickness, the joint pin of the third connecting pin has said second joint pin thickness, and, if the rocker pin of third connecting in has said second rocker pin thickness, the joint pin of the third connecting pin has said first joint pin thickness.

2. A silent chain according to claim 1, in which, in each widthwise row of link plates in the chain, all of the link plates have the same engagement pitch.

3. A silent chain according to claim 1, in which said link plates of the chain consist of link plates of the first set and link plates of the second set, and in which the connecting pins of the chain consist of a first group of connecting pins having a first thickness, a second group of connecting pins having a second thickness, and a third group of connecting pins having a third thickness.

4. A silent chain according to claim 1, in which, in each widthwise row of link plates in the chain, all of the link plates have the same engagement pitch, and in which said link plates of the chain consist of link plates of the first set and link plates of the second set.

* * * * *